Oct. 18, 1927.  1,646,018
J. L. FORCE
LUBRICATING MECHANISM
Filed Feb. 1, 1926
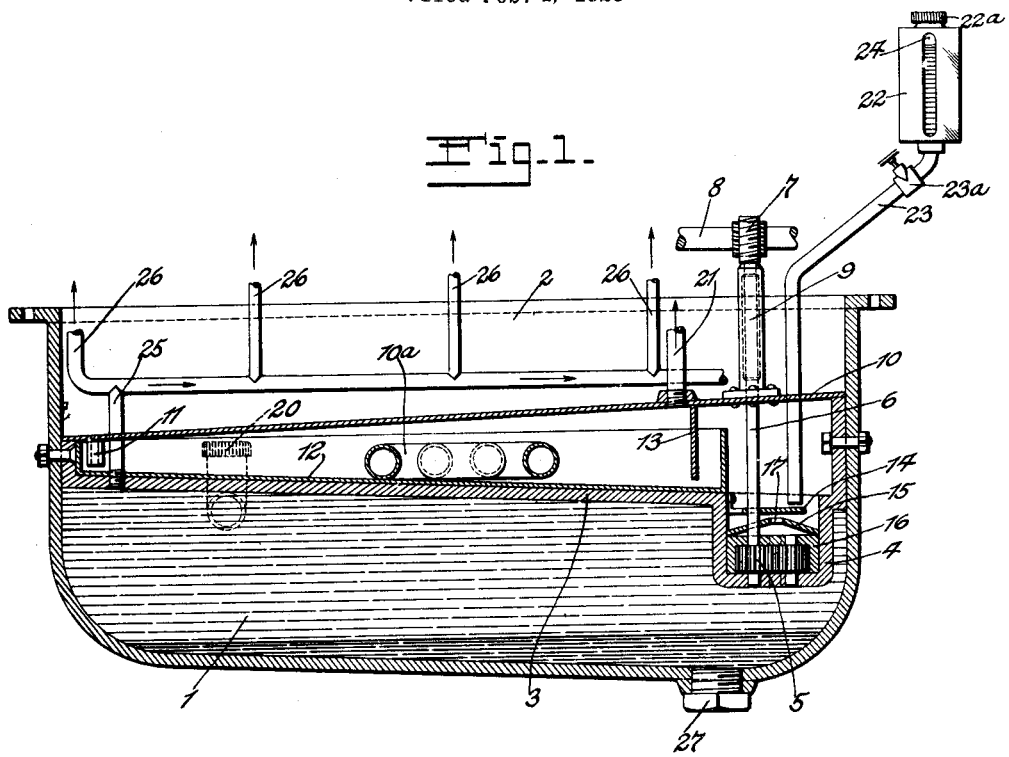
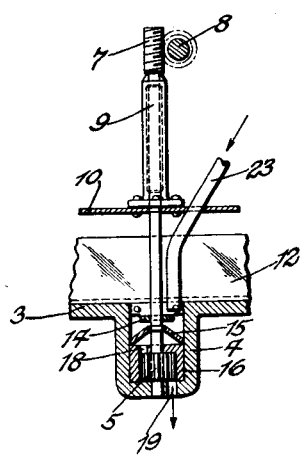
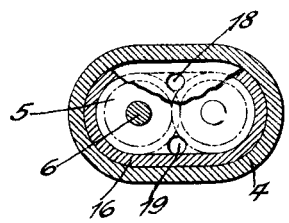
Inventor:
John L. Force,
By Rippey Kingsland
His Attorneys.

Patented Oct. 18, 1927.

1,646,018

UNITED STATES PATENT OFFICE.

JOHN L. FORCE, OF UNIVERSITY CITY, MISSOURI.

LUBRICATING MECHANISM.

Application filed February 1, 1926. Serial No. 85,078.

This invention relates to lubricating mechanism, and it is designed for embodiment in connection with an internal combustion engine to be operated thereby as a top force feed lubricating system to obtain all of the advantages herein specifically mentioned or otherwise made apparent from the description and drawing.

An object of the invention is to provide a force feed lubricating system which will minimize the contamination of the lubricating oil in circulation; prevent the circulation of water, carbon and foreign heavier than oil substances by leaving such substances in the lower part of the oil container; to prevent the surging of the lubricant in the container when making sudden stops, starts or traveling on grades; to provide a construction in which the oil pump and the usual screen protecting the pump are so removed from the water or mixture of water and oil as to render the freezing or congealing of the water or mixture of water and oil harmless to the operation of the apparatus; to provide an entrance for the oil to the pump that will prevent passage to the pump of any matter contained in the oil that will clog or freeze; and to provide for a reserve supply of oil to replenish the oil used in lubricating the engine in proportion to the use of the oil, thus maintaining a full supply of oil in the main oil reservoir.

Other objects will appear from the following description, reference being made to the drawing in which, Fig. 1 is a sectional view of the invention embodied in the oil reservoir of an engine;

Fig. 2 is a cross sectional view of the pump mechanism; and

Fig. 3 is an enlarged horizontal sectional view of the pump mechanism.

The main oil reservoir 1 is below the usual crank case 2. The invention comprises a supporting plate 3 forming a top wall for the main reservoir 1 and provided with a depending pump chamber 4. One of the two pump gears 5 is attached to the lower end of a shaft 6 driven by the worm gear devices 7 from the cam shaft 8 of the engine. The lower end of the shaft 6 has bearing in the lower wall of the chamber 4 and the upper end has bearing in a part 9. A plate 10 may be mounted in the crank case and inclined slightly from the horizontal so that the oil dripping or flowing from the operating parts of the engine will flow to the end opposite from the pump and thence through a passage 11 into a pan 12. When the plate 10 and the pan 12 are used, a baffle 13 attached to the plate 10 extends downwardly from the plate 10 and has its lower edge spaced slightly above the bottom of the pan, leaving a passage between the lower edge of the baffle and the bottom of the pan through which the oil passes. The oil flows over the end of the pan toward the pump mechanism, thus maintaining a quantity of oil in the pan sufficient to cover the heating coils $10^a$ in the pan to remove the gasoline content from the oil. From the pan 12, the oil passes to the main lubricating system of which the pump is an essential element, though the elements constituting the heating devices are not. In passing to the pump mechanism, the oil passes around a horizontal baffle 14 onto a conical bottom 15 of the pump well. The bottom 15 has a central opening 17 through which the oil passes to the upper wall of the gear housing 16, said upper wall having a hole 18 (Fig. 3), through which the oil passes to the pump. The bottom wall of the pump chamber has a hole 19, through which the oil is forced by the pump into the main reservoir.

The annular chamber or space formed by the conical bottom 15 and the wall of the pump chamber 4 receives and retains the heavier than oil substances, and prevents such substances from settling in the pump mechanism when the engine is stopped. Thus, the pump mechanism is protected from becoming clogged by the freezing of such substances or by the deposit of the substances in the pump.

After having been completely filled with oil through the main oil fill pipe 20 and the air tight cap replaced on the fill pipe, the main oil reservoir 1 receives the circulating oil supply from the oil pump when the latter is in operation. The circulating oil supply is replenished as it is used up from a reserve oil supply chamber 22. A pipe 23 leads from the chamber 22 and terminates slightly above the baffle 14 so that a full supply of oil is maintained in the main oil reservoir at all times. As the lower end of the pipe 23 is immersed in oil above the pump, the flow of oil from the chamber 22 is in proportion to the amount required to maintain a full supply of oil in the main oil reservoir. The reserve oil chamber 22 may be supported in a place convenient for observation and provided with a sight opening 24 closed by glass or other transparent material. A valve 23ª in the pipe 23 is closed during the filling of the chamber 22 and is opened after the air tight cap 22ª has been replaced.

The pump is operated by an engine driven shaft when the engine is running and the oil flowing to the pump from above is forced down into the main oil reservoir and thence upwardly through a pipe 25 from which the oil distribution pipes 26 extend to discharge the oil to the parts to be lubricated.

In the course of operation, the heavier than oil impurities are deposited in the bottom of the main oil reservoir 1, where they remain until withdrawn through the drain outlet 27.

The invention can be manufactured and installed economically and without substantial change in standard designs of engines, and avoids and overcomes many of the difficulties and objections in existing types of engines. It is apparent that the invention may be modified in various particulars without departure from the nature and principle thereof and well within the scope of the appended claims. I do not restrict myself unessentially, but what I claim and desire to secure by Letters Patent is:—

1. Engine lubricating mechanism in an engine crank case comprising a main oil reservoir covering substantially the whole bottom of the crank case and containing nearly all of the oil carried by the engine and having an inlet from the pump, a top wall closing the upper side of said reservoir and having its under surface in constant contact with the oil in said reservoir during operation of the engine irrespective of any inclination of the engine during use, a filling pipe opening into said reservoir, a pump operative to force into said reservoir through said inlet oil flowing from the lubricated parts of the engine, and means for conducting the oil from said reservoir to the parts of the engine to be lubricated.

2. Engine lubricating mechanism in an engine crank case comprising a main oil reservoir covering substantially the whole bottom of the crank case and containing nearly all of the oil carried by the engine and having an inlet from the pump, a top wall closing the upper side of said reservoir and having its under surface in constant contact with the oil in said reservoir during operation of the engine irrespective of any inclination of the engine during use, a filling pipe opening into said reservoir, a pump operative to force into said reservoir through said inlet oil flowing from the lubricated parts of the engine keeping said oil reservoir completely filled with oil during operation of the pump, and means for conducting the oil from said reservoir to the parts of the engine to be lubricated.

3. Engine lubricating mechanism in an engine crank case comprising a main oil reservoir covering substantially the whole bottom of the crank case and containing nearly all of the oil carried by the engine and having an inlet from the pump, a top wall closing the upper side of said reservoir and having its under surface in constant contact with the oil in said reservoir during operation of the engine irrespective of any inclination of the engine during use, a filling pipe opening into said reservoir, a pump operative to force into said reservoir through said inlet oil flowing from the lubricated parts of the engine keeping said oil reservoir completely filled with oil during operation of the pump, means for conducting the oil from said reservoir to the parts of the engine to be lubricated, and baffle devices above said top wall regulating flow of oil toward said pump.

4. Engine lubricating mechanism in an engine crank case comprising a main oil reservoir covering substantially the whole bottom of the crank case and containing nearly all of the oil carried by the engine and having an inlet from the pump, a top wall closing the upper side of said reservoir and having its under surface in constant contact with the oil in said reservoir during operation of the engine irrespective of any inclination of the engine during use, a filling pipe opening into said reservoir, a pump operative to force into said reservoir through said inlet oil flowing from the lubricated parts of the engine keeping said oil reservoir completely filled with oil during operation of the pump, means for conducting the oil from said reservoir to the parts of the engine to be lubricated, and means for preventing heavier than oil substances from passing to the pump when the pump is idle.

5. An engine lubricating mechanism in an engine crank case comprising a main oil reservoir covering substantially the whole bottom of the crank case and containing nearly all of the oil carried by the engine and having an inlet from the pump, a top wall closing the upper side of said reservoir and having its under surface in constant contact with the oil in said reservoir during operation of the engine irrespective of any inclination of the engine in use, a filling pipe opening into said reservoir, a pump, means for operating said pump when the engine is running to force oil through said inlet into said reservoir, and means for preventing the flow of heavier than oil substances to the pump.

6. An engine lubricating mechanism in an engine crank case comprising a main oil reservoir covering substantially the whole bottom of the crank case and containing nearly all of the oil carried by the engine and having an inlet from the pump, an inclined top wall closing the upper side of said reservoir and having its under surface in constant contact with the oil in said reservoir during operation of the engine irrespective of any inclination of the engine in use, a filling pipe opening into said reservoir, a pump, means for operating said pump when the engine is running to force oil through said oil into said reservoir, means for regulating the flow of heavier than oil substances to the pump, and means for conducting oil from said main oil reservoir near the highest part of said top wall to the parts to be lubricated.

7. An engine lubricating system in an engine crank case comprising a main oil reservoir covering substantially the whole bottom of the crank case and containing nearly all of the oil carried by the engine, a top wall for said reservoir having its under side in constant contact with the oil in said reservoir, a filling pipe opening into said reservoir under said top wall, a pump chamber having an opening into said reservoir, a pump in said chamber, means for operating said pump from the engine, a chamber for preventing heavier than oil substances from passing to said pump, and means for conducting oil from said oil reservoir to the parts of the engine to be lubricated.

8. An engine lubricating system comprising a main oil reservoir, a top wall for said reservoir, having its under side in constant contact with the oil in said reservoir, a pump chamber, a pump in said chamber, means for operating said pump from the engine, an oil pan above said top wall having its end wall terminating at a distance above said top wall preventing passage of certain foreign substances to the pump, and means for conducting oil from said main oil reservoir to the parts to be lubricated.

9. An engine lubricating system comprising a main oil reservoir, a top wall for said reservoir having its under side in constant contact with the oil in said reservoir, a pump below the plane of said top wall for forcing oil into said main oil reservoir, baffle elements regulating flow of oil toward said pump, and a plate above said top wall receiving oil dripping from the engine and inclined downwardly in a direction away from said pump.

10. An engine lubricating system comprising a main oil reservoir, a top wall for said reservoir having its under side in constant contact with the oil in said reservoir, a pump for forcing oil into said main oil reservoir, baffle elements regulating flow of oil toward said pump, a plate above said top wall receiving oil dripping from the engine and inclined downwardly in a direction away from said pump, and means for conducting oil from above said plate toward said pump.

11. An engine lubricating system in an engine crank case comprising a main oil reservoir covering substantially the whole bottom of the crank case and containing nearly all of the oil carried by the engine, a top wall for said reservoir having its under side in constant contact with the oil in said reservoir, an inclined wall above said top wall receiving oil dripping from the lubricated parts, a pump below the upper end of said inclined wall operative to force oil into said main oil reservoir, and means for conducting oil from said main oil reservoir to the parts to be lubricated.

12. An engine lubricating system in an engine crank case comprising a main oil reservoir covering substantially the whole bottom of the crank case and containing nearly all of the oil carried by the engine, a top wall for said reservoir having its under side in constant contact with the oil in said reservoir, an inclined wall above said top wall receiving oil dripping from the lubricated parts, a pump below the upper end of said inclined wall operative to force oil into said main oil reservoir, baffle elements regulating flow of oil between said walls toward said pump, and means for conducting oil from said oil reservoir to the parts to be lubricated.

JOHN L. FORCE.